US008380663B2

(12) United States Patent
Thode

(10) Patent No.: US 8,380,663 B2
(45) Date of Patent: Feb. 19, 2013

(54) DATA INTEGRITY IN A DATABASE ENVIRONMENT THROUGH BACKGROUND SYNCHRONIZATION

(75) Inventor: Michael Thode, Waterloo (CA)

(73) Assignee: Sybase, Inc., Dublin, CA (US)

( * ) Notice: Subject to any disclaimer, the term of this patent is extended or adjusted under 35 U.S.C. 154(b) by 269 days.

(21) Appl. No.: 12/336,693

(22) Filed: Dec. 17, 2008

(65) Prior Publication Data

US 2010/0153346 A1    Jun. 17, 2010

(51) Int. Cl.
*G06F 7/00* (2006.01)
*G06F 17/00* (2006.01)

(52) U.S. Cl. ........................ 707/610; 707/639
(58) Field of Classification Search .............. None
See application file for complete search history.

(56) References Cited

U.S. PATENT DOCUMENTS

| | | | |
|---|---|---|---|
| 6,341,288 B1 | 1/2002 | Yach et al. | |
| 6,499,039 B1 * | 12/2002 | Venkatesh et al. | 1/1 |
| 6,631,386 B1 * | 10/2003 | Arun et al. | 1/1 |
| 7,653,664 B2 * | 1/2010 | Chitre et al. | 707/610 |
| 7,769,722 B1 * | 8/2010 | Bergant et al. | 707/681 |
| 7,792,885 B2 * | 9/2010 | Piper et al. | 707/600 |
| 2003/0023609 A1 * | 1/2003 | Della-Libera et al. | 707/101 |
| 2004/0224675 A1 * | 11/2004 | Puskoor et al. | 455/419 |
| 2005/0027748 A1 * | 2/2005 | Kisley | 707/200 |
| 2006/0036574 A1 * | 2/2006 | Schweigkoffer et al. | 707/2 |
| 2006/0136354 A1 * | 6/2006 | Bell et al. | 707/1 |
| 2007/0067349 A1 | 3/2007 | Jhaveri et al. | |
| 2007/0190978 A1 * | 8/2007 | White et al. | 455/412.1 |
| 2007/0208773 A1 * | 9/2007 | Tsao | 707/103 R |
| 2008/0177861 A1 * | 7/2008 | Basani et al. | 709/218 |
| 2009/0083337 A1 * | 3/2009 | Parees et al. | 707/201 |
| 2009/0125518 A1 * | 5/2009 | Bailor et al. | 707/8 |

FOREIGN PATENT DOCUMENTS

| | | |
|---|---|---|
| KR | 10-2006-0043620 A1 | 5/2006 |
| WO | WO 2007/044964 A2 | 4/2007 |

OTHER PUBLICATIONS

*Designing Mobile Applications: Why Sync Is Central*, White Paper, 8 pages, iAnywhere Solutions, Inc., 2007.
*UltraLite® Database Management and Reference*, 438 pages, iAnywhere Solutions, Inc., Mar. 2007.
Search Report and Written Opinion, dated Jul. 13, 2010, for PCT Appl. No. PCT/US2009/066538, 9 pages.

* cited by examiner

*Primary Examiner* — Jay Morrison
(74) *Attorney, Agent, or Firm* — Sterne, Kessler, Goldstein & Fox P.L.L.C.

(57) ABSTRACT

Systems, methods and computer program products for maintaining data integrity in a database environment are described. In operation, a synchronization process is initiated in a remote database system for synchronization of remote data from the remote database system with consolidated data of a consolidated database. Metadata for each row of the remote data is utilized to allow transactional access to the remote data while the synchronization process occurs.

21 Claims, 6 Drawing Sheets

DATA INTEGRITY IN A DATABASE ENVIRONMENT THROUGH BACKGROUND SYNCHRONIZATION

BACKGROUND OF THE INVENTION

1. Field of the Invention

The present invention is generally directed to maintaining data integrity in a database environment, and more particularly, to maintaining data integrity through background synchronization in the database environment.

2. Background Art

In today's expanding computing environments, the workforce for many businesses performs its job using portable, mobile computing devices, such as personal computing laptops, tablets, personal digital assistants, smart phones, and the like. These remote systems typically run mobile business applications that adopt an "always-available"/"occasionally-connected" architecture. In this manner, the remote systems store data locally, so that their use of data applications can continue whether or not a network is available. Despite this local data store, the ultimate home of the data for business applications is not the remote system but a consolidated database on a company server. Periodically, the data being utilized and updated among the mobile workforce needs to be synchronized with this central data store of the consolidated database over a wired or wireless network connection to ensure data integrity.

While data synchronization clearly is necessary to maintain data consistency for mobile computing environments, synchronization operations that move data from the mobile device to the consolidated server and from the consolidated server to the mobile device, can demand substantial computer and network resources, and often require a non-trivial amount of time to complete. These operations include tracking data changes on the mobile device and at the server, sending the right changes, making sure that unique key values for the data are preserved, and identifying and resolving conflicts when they occur. Normally, the control necessary for the data synchronization process requires that data access in the remote systems be restricted while the synchronization process occurs, allowing, at most, read-only access to the data. However, the lack of support for concurrent transactional access to the remote database while a synchronization operation is taking place diminishes performance and efficiency.

Accordingly, a need exists for an approach to ensuring data integrity in a database through synchronization that operates in the background of data modification operations in remote database environments. The present invention addresses such a need.

BRIEF SUMMARY OF THE INVENTION

The present invention is directed to systems, methods and computer program products for maintaining data integrity in a database environment.

In an embodiment, the invention operates by initiating a process in a remote database system for synchronization of remote data from the remote database system with consolidated data of a consolidated database, and utilizing metadata for each row of the remote data to allow transactional access to the remote data while the synchronization process occurs.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
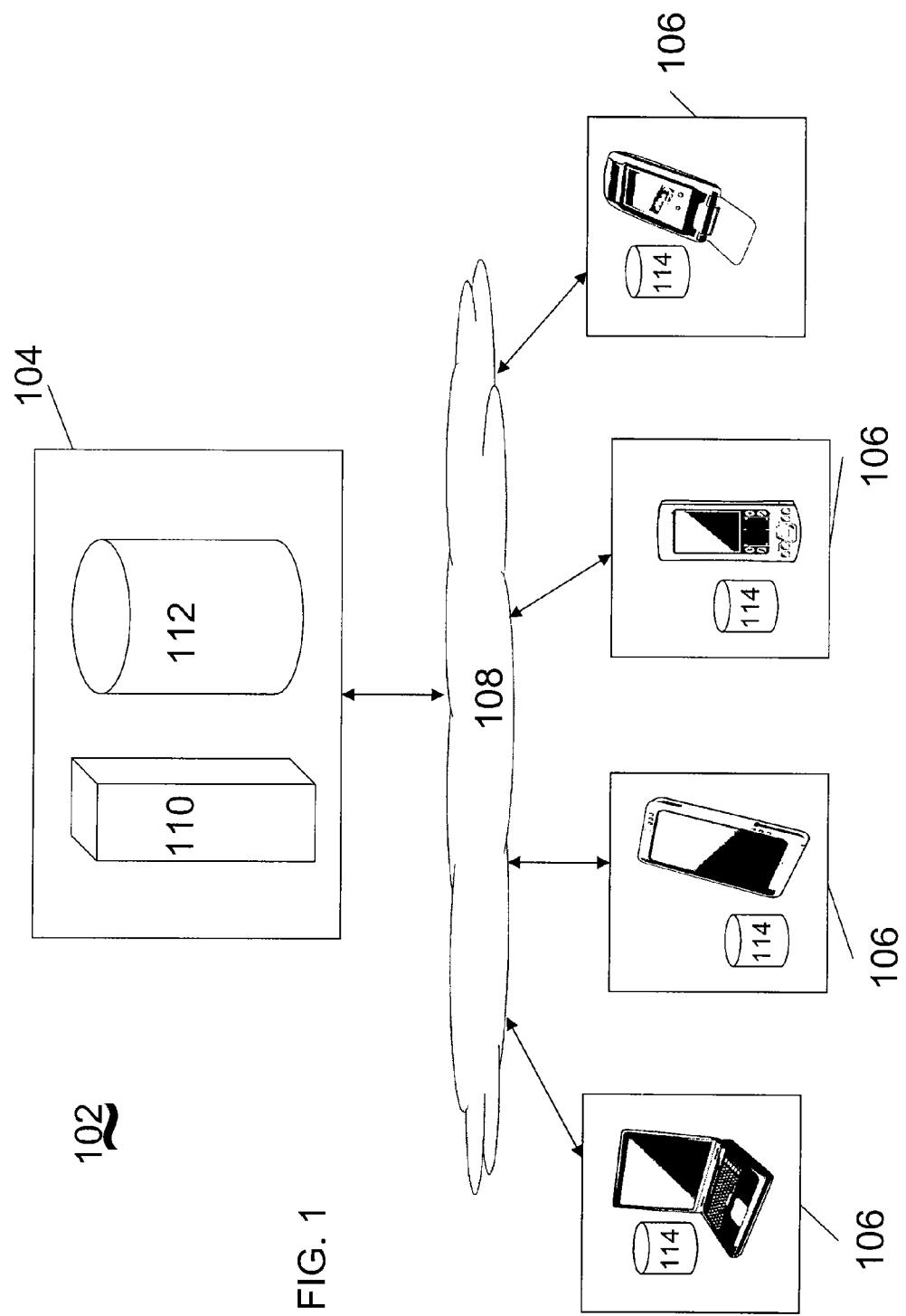
FIG. 1 illustrates a block diagram of an example computing environment that achieves background synchronization according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

In the environment of mobile, and often hand-held, computing systems, utilization of local database applications have to support the needs of data synchronization of the local database with a consolidated database on a network server. An example of a known database application that is more portable across multiple devices, including ones having limited computational power, is described in U.S. Pat. No. 6,341,288, entitled Database System with Methodology for Accessing a Database from Portable Devices, which is assigned to the assignee of the present invention. As computing capabilities, memory devices, and other system components of mobile systems have improved in recent years to support multi-threaded processing, correspondingly, a need has increased for a synchronization process that not only maintains data integrity, but capably operates as a background process to allow substantially continual transactional access and improve efficiency and performance in today's fast-paced, mobile working environment.

FIG. 1 illustrates a block diagram of a mobile computing environment 102 that achieves background synchronization according to an embodiment of the invention. Included are a central system 104 and one or more remote systems 106, such as portable, hand-held mobile computing devices, e.g., laptop computing devices, personal digital assistants, cellular phones, and the like. The central system 104 and remote systems 106 communicate via any known means for a communication network 108, such as, but not limited to, the Internet.

Central system 104 includes a synchronization system 110 and a consolidated database system 112. The consolidated database system 112 capably operates as a database manager and a database, where the database can further include index and table data, and the database manager can be any form of database management system (DBMS) and can include, but is not limited to, a device having a processor and memory for executing and storing instructions. In an example, not intended to limit the invention, the consolidated database system 112 may include software, firmware, and hardware or some combination thereof and the database manager may be a DBMS such as SYBASE Adaptive Sever Enterprise®. The software may include one or more applications and an operating system. The hardware can include, but is not limited to, a processor, memory and user interface display. An optional input device, such as a keyboard, mouse, stylus or any other pointing device, may be used. The database manager may store and manipulate data in database. Database manager may be used directly by system users, as a component of a software package or can be used to provide various services to an independent software package.

Each remote system 106 preferably includes a remote database system 114. The remote database system 114 can further contain a subset of the data in the database of the consolidated database system 112, the subset of data including a database index and table data. The remote system 106 can include, but is not limited to, a device having a processor and memory for executing and storing instructions. In an example, not intended to limit the invention, the remote database system 114 may be provided as SYBASE SQL Anywhere UltraLite® and may include software, firmware, and hardware or some combination thereof. The software may include one or more applications and an operating system. The hardware can include, but is not limited to, a processor, memory and user interface display. An optional input device, such as a keypad, stylus or any other pointing device, may be used.

The database of the consolidated database system 112 and the subset of that database in the remote database system 114 may be a collection of data which is managed and manipulated according to various logical data models, or views of stored data, as known to those skilled in the art. Examples of logical data models in the present database market include the relational model, using the industry-standard SQL query language. Database tables are known to those of skilled in the art and may further include several records, each record composed of several fields.

As an example, manipulating data in a relational architecture system includes manipulation of tables, shared columns and indexes that may reside in the database. For example, in the remote database systems 114, a row map store structure may maintain a mapping from a row identifier to a row state (row states are described further hereinbelow) and a row handle. The row identifier may be added to the end of the column list to act as part of a key for the index that provides an ordered list of columns and row identifiers. The row handle may contain the coordinates of the row data in the store structure. Conceptually, the row map is a linear array, indexed by the row identifier. The array is stored by allocating segments of the array on store pages, and linking them together in a tree with interior addressing nodes, with depth corresponding to a size of the row map. With similarities to known B-tree structures, the leaves of the tree contain the actual array. The root and interior nodes serve to address the array with minimal input/output cost.

Synchronization system 110 operates to ensure data integrity between the database of the consolidated database system 112 and the subset of that database in the remote database systems 114. In an example, not intended to limit the invention, the synchronization system 110 may be provided as SYBASE SQL Anywhere MobiLink® and may include software, firmware, and hardware or some combination thereof. Efficient data synchronization between the remote systems 106 and the central system 104 occurs by communicating changes to the data.

In a preferred embodiment, a background synchronization process is achieved for the mobile computing environment 102 by creating a "snapshot" of the data on the remote database system 114 at a point in time to know what data changes should be uploaded to the central system 104 and what should be ignored. The snapshot employs metadata in the form of multiple types of bit values, including an upload value, as a row state for each row of data. This metadata must account for tracking of a row condition beyond merely a simple single bit to indicate an insert or delete of a row, since a row being synchronized in the background may also be being changed in the foreground. Thus, the metadata of the present invention tracks and identifies row(s) that are modified in the course of database operations that may be occurring even as one background synchronization is processed in order to ensure that any modification gets captured on a next background synchronization process.

Figure 2:
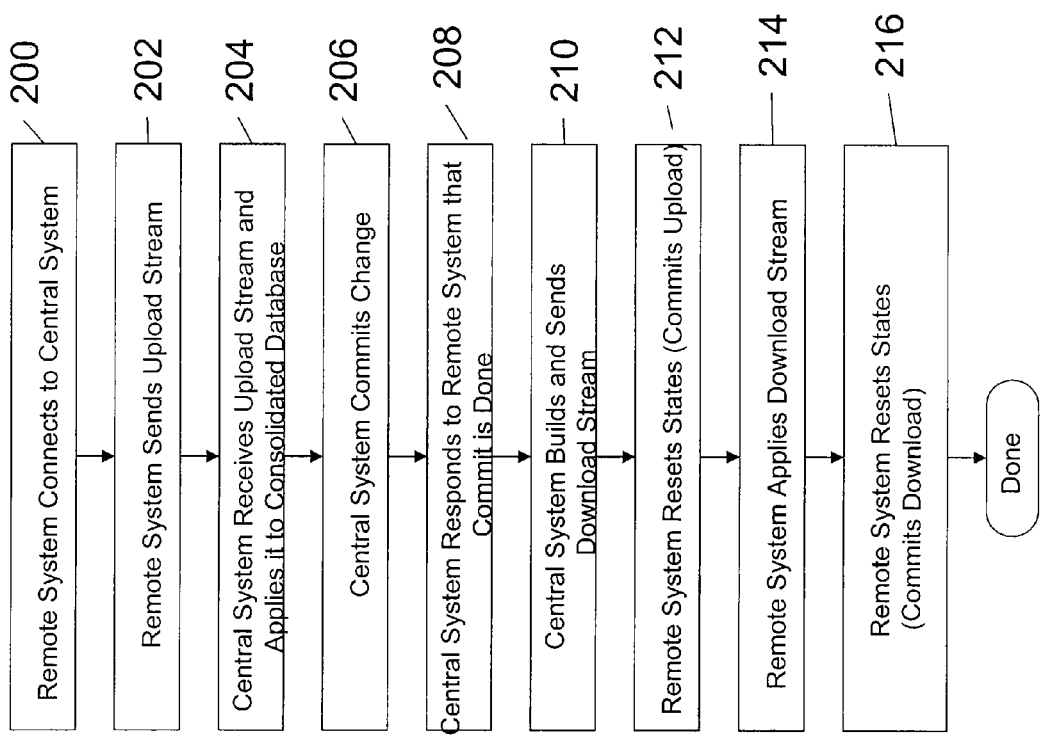
FIG. 2 illustrates a block diagram for an overall flow of a synchronization process to ensure data integrity in a database environment according to an embodiment of the invention.

Referring now to the FIG. 2, a block diagram for an overall flow of a synchronization process to ensure data integrity in a database environment in accordance with the present invention is presented. As will be described, during the synchronization, there are few distinct exchanges of information, which limits the "chatting" of the protocol. This can be advantageous when communication may be slower and has higher latency, such as when using telephone lines or public wireless network connections, as is well appreciated by those skilled in the art.

Typically, the initiation of a synchronization process occurs when there is an established connection between the remote system 106 and the central system 104 via communication network 108 upon a user selection to perform a data synchronization (block 200). The data to be synchronized is sent in an upload stream from the remote system 106 to the central system 104 (block 202). In a preferred embodiment, the building of the upload stream relies on the use of row state metadata to identify which rows to send to the central system 104 and the condition of those rows. Through the use of the row state metadata, synchronization functionality occurs without using typical log transaction tracking and coalescing, as is well known in the art, and which is a much more complicated and time-consuming approach.

Upon receipt of the upload stream, the central system 104 applies the upload stream to the consolidated database system 112 (block 204) and commits the changes from the upload stream on the consolidated database system 112 (block 206). With the data changes committed to complete the upload phase of the synchronization process, the central system 104 initiates a download phase by sending a response to the remote system 106 indicating that the commit of the upload stream is completed on the central system 104 (block 208). The central system 104 then builds and sends a download stream to the remote system 106 (block 210). The remote system 106 adjusts the states of the row metadata for the rows that were successfully uploaded (block 212) and applies the received download stream (block 214). Based on the data from the download stream, any necessary adjustments are made to the row state to commit the data from the download in the remote database system 114 (block 216) and complete the synchronization process.

Figure 3:
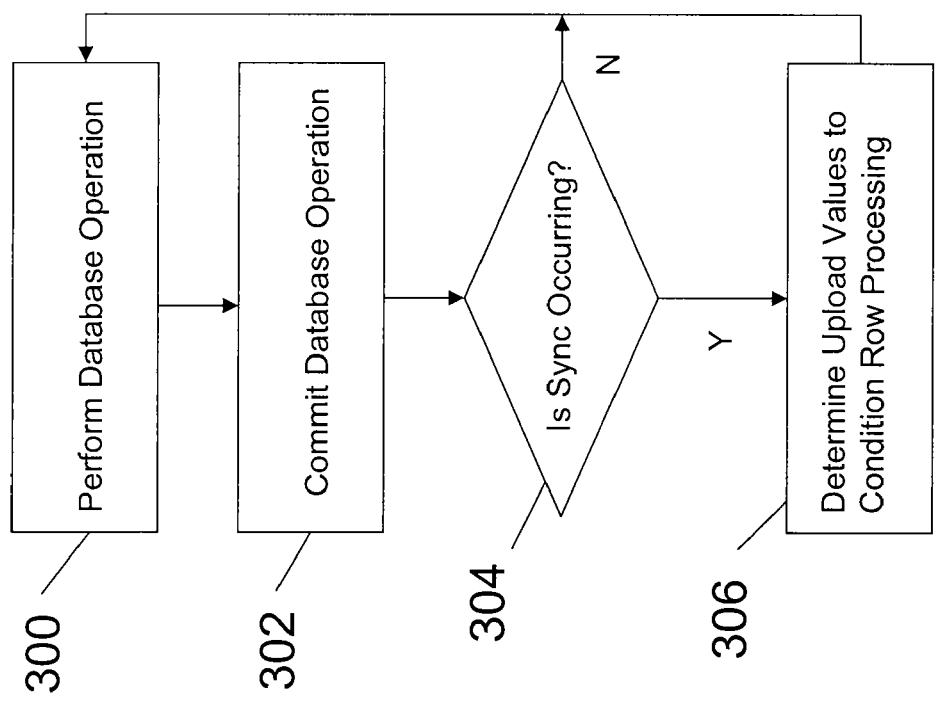
FIG. 3 illustrates a block diagram of an overall flow for maintaining metadata for a synchronization process according to an embodiment of the invention.

Referring now to FIG. 3, an overall process is presented for maintaining the metadata to achieve the synchronization process of FIG. 2 in accordance with the present invention. The process initiates when a user of remote system 106 performs a database operation (block 300), e.g., a delete, an update, or an add operation. Depending upon which operation occurs, the metadata of the row state is used to reflect any change. As represented in the following list, in a preferred embodiment, the metadata includes four values that together provide the row state:

insert type (NORMAL, INSERT, POST-IMAGE);
    delete type (NONE, DELETE, REMOVE);
    commit state (INSERT COMMITTED, INSERT NOT COMMITTED, MAYBE); and
    upload state (NOT COMPUTED, INCLUDED, EXCLUDED).

To allow for the three conditions per value, eight bits (2 bits per value) can be used to provide the metadata.

By way of example, on an initial insert of a row as the database operation, the insert type value=INSERT, the delete type value=NONE, the commit state value=INSERT NOT COMMITTED, and the upload state value=NOT COMPUTED. On an update of a row, the new version of the row is marked with delete type value=NONE, a commit state value=INSERT NOT COMMITTED, and an upload state value=NOT COMPUTED. For the insert type value on the row update, the POST-IMAGE value condition is used if the old version of the row has a delete type value that is not equal to REMOVE and the insert type value is POST-IMAGE or the delete type value is not equal to REMOVE and the commit state value equals MAYBE or INSERT COMMITTED. The word "maybe" is used in those cases where changes to a row "may" have been uploaded, but there is uncertainty because an acknowledgement has not been received yet. Otherwise, the insert type value=INSERT. With either POST-IMAGE or INSERT for the insert type value of the new row, the old version of the updated row is changed to have a delete type value=DELETE.

On a row delete, usually the delete type value=DELETE. However, in an embodiment, a stop synchronization setting may be used to allow certain data to not be subject to a synchronization process. The intent of the feature is to reduce the subset of rows that each remote system 106 holds from the consolidated database 114. That is, the deletes are not really deletes from the point of view of the consolidated database 114, and so they should not be uploaded. The REMOVE value for the delete type is used to reflect this.

After the performance of a database operation, the process continues by committing the database operation (block 302). The commitment of the database operation depends on whether there has been a prior synchronization of the affected row(s). For a delete, if the row has never been synchronized, then it is removed. If the row has been synchronized, then it is not removed, because the delete operation needs to be synchronized to the consolidated database first. When a transaction to update a row is committed, the states of all rows affected by the transaction are modified to reflect the commit. When an update is synchronized, both the old and new versions of the row are needed to allow conflict detection and resolution. The old row is then deleted from the database and the new row simply becomes a normal row. The addition of a row results in the row being marked as committed.

For each database operation (insert, update and delete), additional flagging occurs via an update to the upload state value condition of the row state metadata when a check for a synchronization process is affirmative (block 304) to condition the row processing during the synchronization (block 306). If no synchronization process is occurring (block 304 is negative), the remote database system ignores the upload state value portion of the row state and continues with standard processing of the database transaction (block 300).

As indicated in the list above, in a preferred embodiment, the upload state value conditions include NOT COMPUTED, INCLUDED, and EXCLUDED, where the NOT COMPUTED value is used to indicate that no commits have taken place on the row since the upload of the synchronization began, the INCLUDED value is used to indicate that a row should be part of the synchronization, and the EXCLUDED value is used to indicate that a row is not part of the synchronization. These upload state values of the row state metadata enable the synchronization operation to work with a snapshot of the committed state of the database at the moment the upload begins. With this snapshot, there can be changes to the database which won't affect what gets uploaded, and the integrity of the uploaded data is ensured as the remote system 106 continues to process database transactions.

Figure 4:
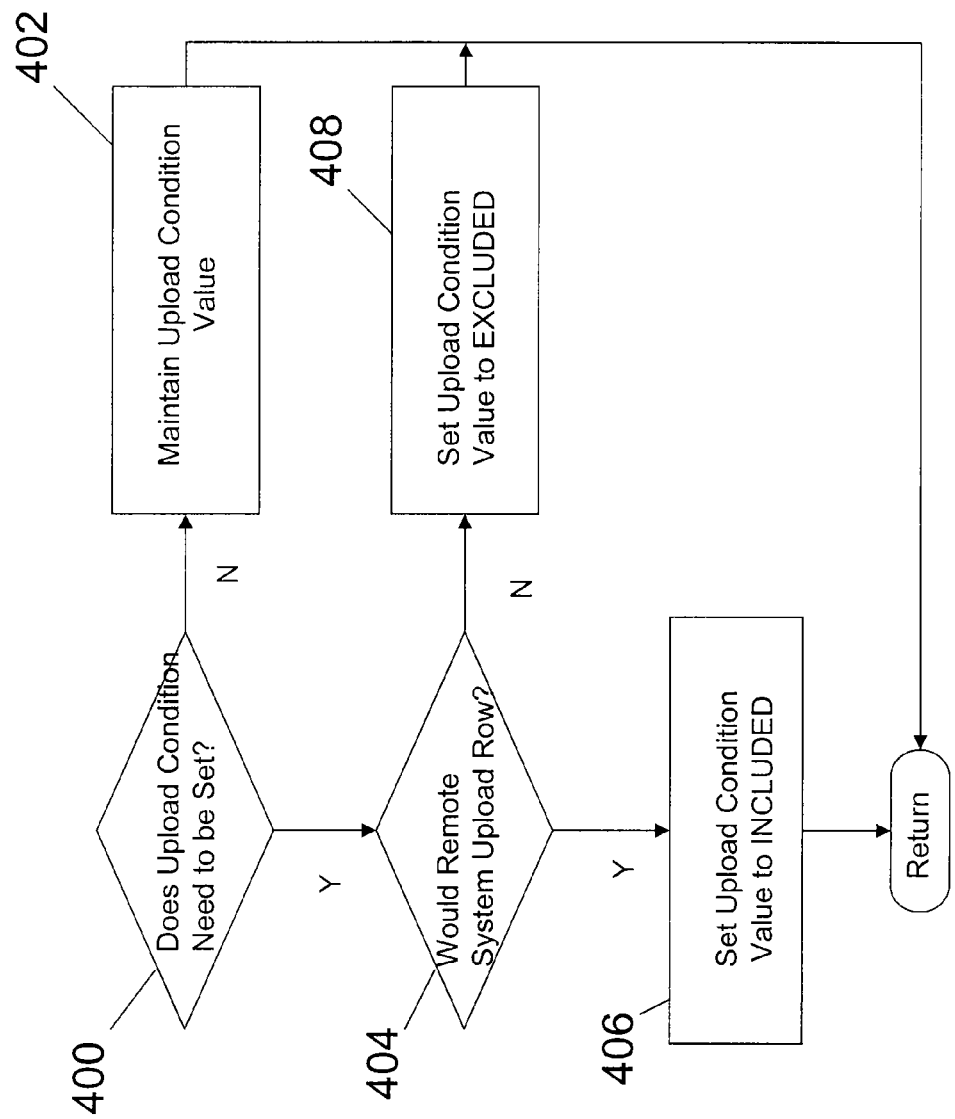
FIG. 4 illustrates a block diagram of an overall flow for determining an upload state value portion of the metadata according to an embodiment of the invention.

A process for determining the upload state value portion of the row state metadata is presented with reference to the block flow diagram of FIG. 4. An initial check of the upload state value occurs to identify whether it actually needs to be set (block 400). In general, the upload state values of the row state are set to either INCLUDED or EXCLUDED when a commit of a row occurs during a synchronization and are cleared back to NOT COMPUTED upon completion of the synchronization.

Thus, if the upload state value is already set to INCLUDED or EXCLUDED, then no change to the upload state value is needed, since a set upload state value indicates that this is not the first commit on this row since the upload began. Further, if the commit state value condition of the row state is MAYBE, then the row has already been uploaded but has yet to be confirmed as successfully completed, and no change should occur for the upload state value portion of that row. In these situations, the upload state value is maintained (block 402) and the process is complete.

If the upload state value does need to be set (block 400 is affirmative), i.e., the commit state value condition is not equal to MAYBE and the upload state value condition is equal to NOT COMPUTED, a determination is made to identify how the row would be handled for the synchronization if the row were in its uncommitted state (block 404). If it is identified that the system would upload the row (block 404 is affirmative), then the upload value is set to INCLUDED (block 406). Otherwise, the upload value is set to EXCLUDED (block 408).

In a preferred embodiment, a row does not need to be uploaded and the upload state value condition is set to EXCLUDED for rows that are found to have a row state represented with an insert type=NORMAL, commit state=INSERT COMMITTED, and delete type=NONE or REMOVE. A row needs to be uploaded and the upload state value condition is set to INCLUDED if the delete type value condition is equal to DELETE and the insert type value condition is equal to NORMAL, or if the delete type value condition is equal to REMOVE and the insert type value condition is not equal to NORMAL.

Figure 5:
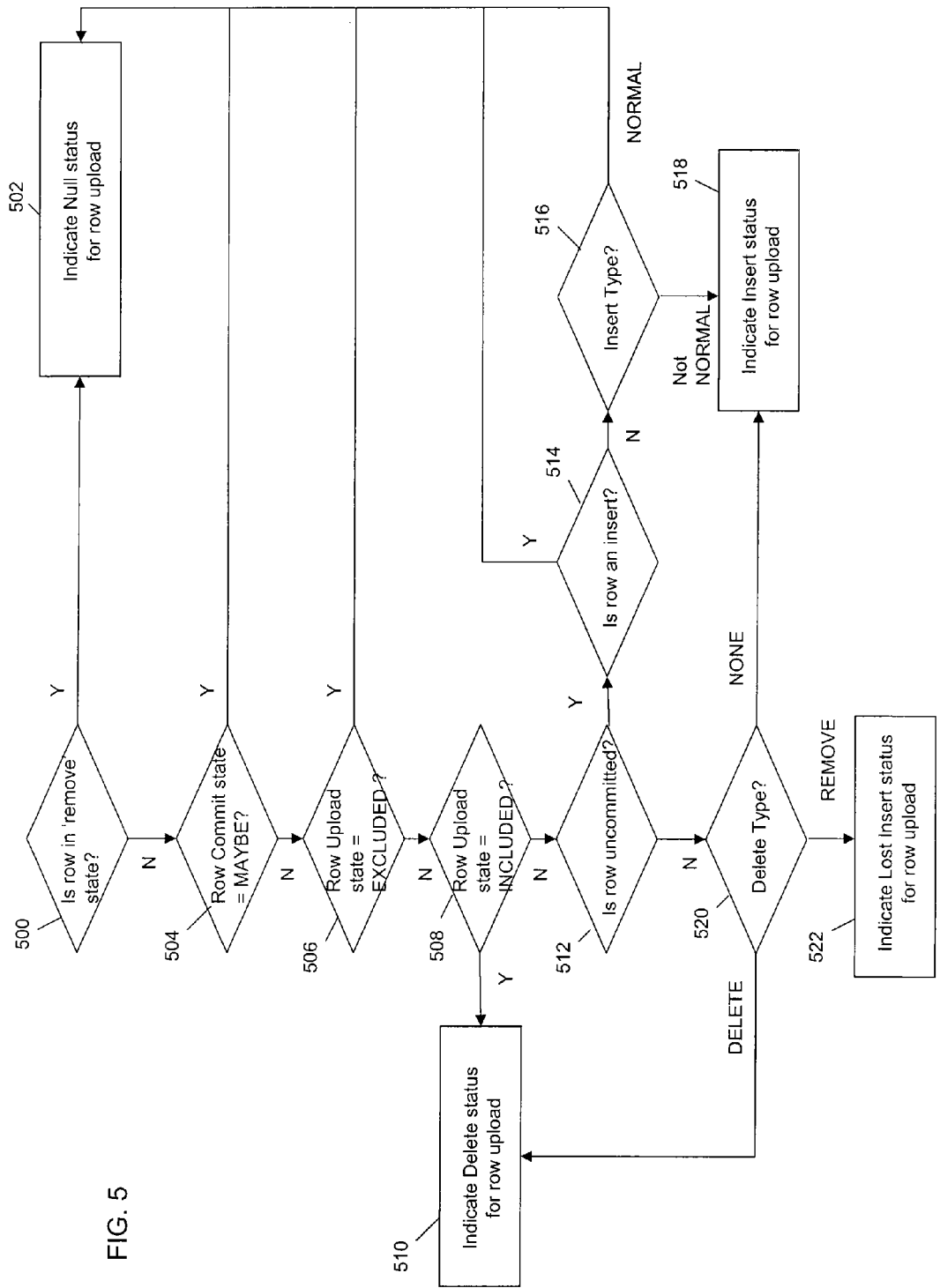
FIG. 5 illustrates a block diagram of an overall flow for interpretation of the upload state value to affect the synchronization process according to an embodiment of the present invention.

A process for interpretation of the upload state value condition to affect the synchronization process is presented with reference to the block flow diagram of FIG. 5. In accordance with an embodiment of the present invention, the process is utilized during an upload to determine how each row should be uploaded by identifying one of four status indicators, either a Null status which indicates that the row does not get uploaded, an Insert status which indicates that the row is to be uploaded as an insert, a Delete status which indicates that the row is to be uploaded as a delete, or a Lost Insert status which indicates that the row is to be uploaded as a lost insert. The Lost Insert is very similar to an Insert but helps account for a row with a REMOVE setting as the delete type as a result of the stop synchronization setting. In general, the synchronization system 110 would not download a row that was just uploaded. That is, if the consolidated database system 112 determines that a Lost Insert row should be downloaded to the remote system 106, normally the synchronization system 110 will optimize the download to omit downloading that row, since the synchronization system 110 knows that the remote database system 106 already contains that row. However, through the use of the Lost Insert status, the row is identified to the synchronization system 110 as being removed from the remote database. This disables the normal optimization and allows the row to be downloaded to the remote system 106.

The process initiates under an assumption that a row being considered is not in a 'normal' state, since in a preferred embodiment, the map iteration over the rows is conditioned to skip 'normal' rows, i.e., those rows having an insert type=NORMAL, a delete type=NONE, a commit state value=INSERT COMMITTED, and an upload state value=NOT COMPUTED. Given a row that is not in the 'normal' state, the process determines if the row state is equivalent to a 'remove' state (block 500). A 'remove' state preferably refers to an insert type=NORMAL, a delete type=REMOVE, a commit state value=INSERT COMMITTED, and an upload state value=NOT COMPUTED. When the row is in a 'remove' state, it does not need to be considered for upload (block 502) and a Null status is indicated.

If the row is not in a 'normal' state or in a 'remove' state, the process continues by determining if the row commit state value=MAYBE (block 504). If so, the row was already uploaded in the synchronization process that is in progress and does not need to be considered for upload again. Accordingly, a Null status is indicated (block 502). This check ensures that an upload that occurs as a two pass process is accounted for, where, for example, a first pass uploads inserts and updates, and a second pass uploads deletes, with each pass being implemented using a map iterate.

When the row commit state value is not MAYBE, the process continues by checking the upload state value of the row. If the upload state value=EXCLUDED (block 506), then the row does not need to be considered for upload and the Null status is indicated (block 502). If the upload state value=INCLUDED (block 508), then a status of Delete is indicated (block 510), since an insert committed after the upload began does not upload and thus would not have an upload state value of INCLUDED.

To account for a row that has been modified but not committed (i.e., has an upload state value=NOT COMPUTED), the process continues by determining if the row is an uncommitted (block 512) and an insert (block 514). If so, then the row is skipped since uncommitted inserts are not uploaded, and the Null status is indicated (block 502). If not, the row is an uncommitted delete, and the insert type is checked (block 516). If the insert type is NORMAL, the row does not need to be included in the synchronization and the Null status is indicated (block 502). For an insert types other than NORMAL, an Insert status is indicated (block 518).

If none of these conditions are found, then the row is a committed row that was committed before the upload began. The delete type value condition is used to determine the status indicator (block 520). For a delete type=NONE, the process returns an Insert indicator (block 518). For a delete type=REMOVE, the process returns a Lost Insert indicator (block 522). And, for a delete type=DELETE, the process returns a Delete indicator (block 510).

In this manner, the synchronization process occurs with the assurance that the metadata for each row properly reflects an accurate row state. As described, the inclusion of the upload value condition allows concurrent access to the remote database while a synchronization is taking place, and there is no need to restrict access to a read-only mode or raise an error on attempts to modify the remote database. Accordingly, an efficient and seamless utilization of the remote database occurs, which is especially beneficial in mobile database environments.

Example Computer Embodiment System

Figure 6:
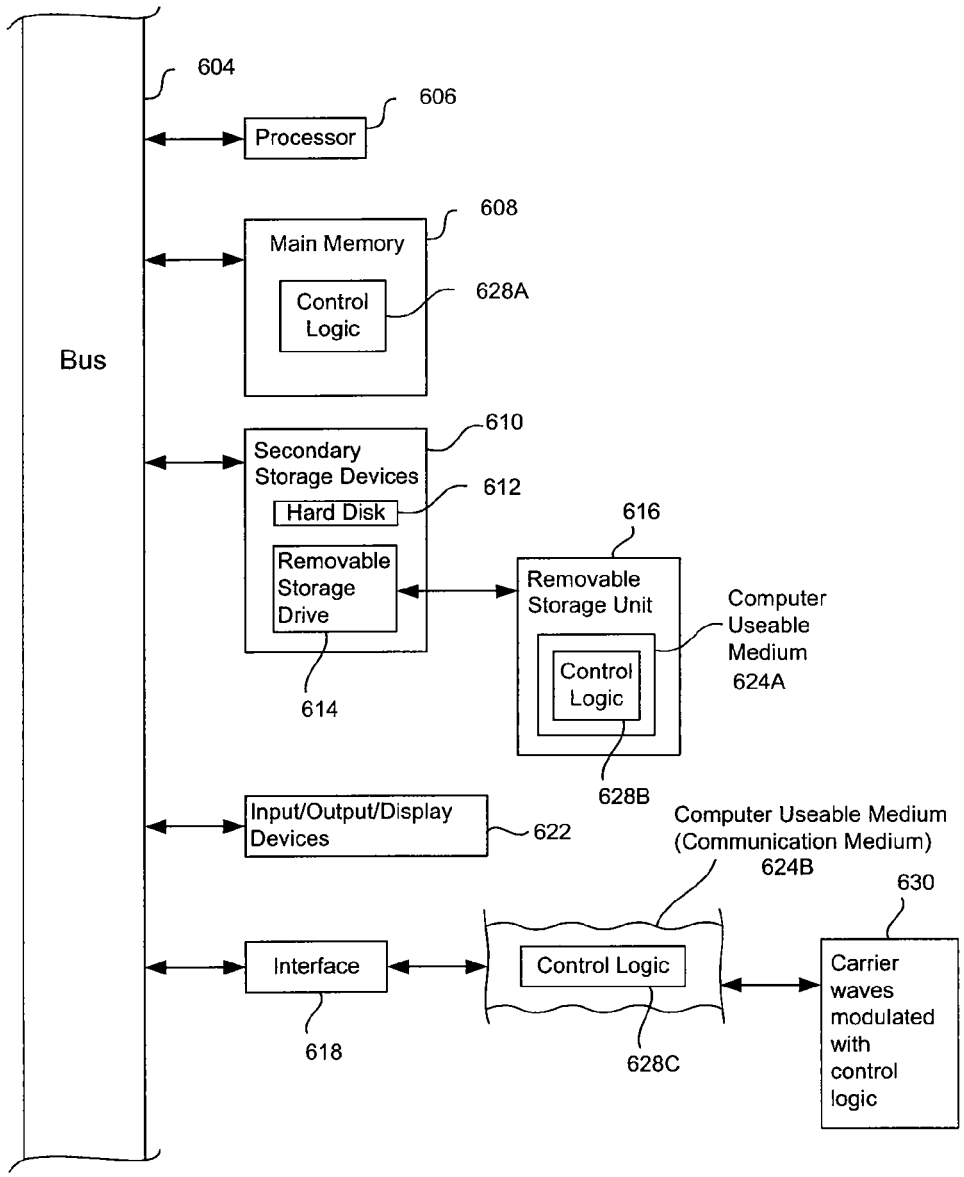
FIG. 6 illustrates an example computer useful for implementing components of the invention.

In an embodiment of the present invention, the system and components of embodiments described herein are implemented using well known computers, such as example computer 602 shown in FIG. 6. For example, central system 104 or remote systems 106 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 508 has stored therein control logic 625A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

While the present invention has been described with reference to a mobile computing environment, this is meant as illustrative and not restrictive of the environments where the background synchronization of the present invention may find application or that would benefit from the functions as described herein.

What is claimed is:

1. A method for ensuring data integrity in a database environment, the method comprising:
   maintaining metadata indicating a row condition state of each respective row of remote data from a remote database system prior to initiating a process for synchronization of the remote data from the remote database system with consolidated data of a consolidated database, wherein the remote data comprises a subset of the consolidated data, the row condition state indicating whether said each row is included in the synchronization;
   upon initiating the process for synchronization, creating a snapshot including the remote data to be uploaded to the consolidated database as determined based on the row condition state of each row as maintained prior to the initiating the process for synchronization; and
   wherein the synchronization is based on the snapshot and allows transactional access and updates to the remote data included in the synchronization to occur while the synchronization occurs, wherein the updates are not included in the snapshot, and wherein the consolidated database includes the consolidated data synchronized with the remote data of the snapshot upon a completion of the synchronization.

2. The method of claim 1, wherein the row condition state includes an insert state value, a delete state value, and a commit state value.

3. The method of claim 1 wherein the row condition includes an upload condition value that is updated during the synchronization process.

4. The method of claim 1, further comprising:
   determining that a delete value of the metadata for a particular row indicates said particular row is marked for deletion from the database; and
   removing said particular row without updating the database based on a determination that a commit value of the metadata for said particular row indicates that said particular row was not previously committed to the database.

5. The method of claim 3 wherein a first upload condition value indicates that no transaction commits have occurred after initiation of the synchronization.

6. The method of claim 5 wherein a second upload condition value indicates that a row requires synchronization.

7. The method of claim 6 wherein a third upload condition value indicates that a row does not require synchronization.

8. The method of claim 3 further comprising setting at least the upload condition value when a commit of a row occurs during the synchronization and clearing at least the upload condition value when the synchronization completes.

9. The method of claim 3 wherein each row condition state allows for three conditions.

10. A system for ensuring data integrity in a database environment, the system comprising:
    a database manager coupled to a communication network and including a consolidated database,
    wherein the database manager is configured to perform a data synchronization process and maintain metadata indicating a row condition state of each respective row of remote data from at least one remote database system coupled to the communication network prior to initiating a process for synchronization of the remote data from the at least one remote database with consolidated data of the consolidated database, the row condition state indicating whether said each row is included in a synchronization, and the process comprising:
    upon initiating the process for synchronization, creating a snapshot including the remote data to be uploaded to the consolidated database as determined based on the row condition state of each row as maintained prior to the initiating the process for synchronization, and
    wherein the synchronization is based on the snapshot and allows transactional access and updates to the remote data included in the synchronization to occur while the synchronization occurs, wherein the updates are not included in the snapshot, and wherein the consolidated database includes the consolidated data synchronized with the remote data of the snapshot upon a completion of the synchronization.

11. The system of claim 10 wherein the metadata includes one or more values that indicate whether a respective row is inserted or deleted, included or excluded, and committed or not committed during the synchronization.

12. The system of claim 10 wherein the at least one remote database system identifies when the synchronization process is initiated while a database transaction occurs in the at least one remote database and determines at least an upload value condition when a commit of a row occurs to condition row processing during the synchronization.

13. The system of claim 12 wherein a first upload condition value indicates that no transaction commits have occurred after initiation of the synchronization, wherein a second upload condition value indicates that a row requires synchronization, and wherein a third upload condition value indicates that a row does not require synchronization.

14. The system of claim 10 wherein the at least one remote database system comprises a mobile computing device.

15. The system of claim 10, wherein upon completion of the synchronization, the consolidated data includes changes in the remote data as included in the snapshot, and wherein metadata for the updates to the remote data includes an indication for inclusion in a subsequent synchronization with the consolidated database.

16. A computer program product comprising a non-transitory computer useable medium having computer program logic recorded thereon for enabling a processor to perform instructions to determine data integrity in a database environment, the instructions comprising:

instructions for enabling a processor to maintain metadata indicating a row condition state of each respective row of remote data from a remote database prior to initiating a process for synchronization of the remote data with consolidated data of a consolidated database, the row condition state indicating whether said each row is included in the synchronization;

instructions for enabling a processor to, upon initiating the process for synchronization, create a snapshot including the remote data to be uploaded to the consolidated database as determined based on the row condition state of each row as maintained prior to the initiating the process for synchronization; and instructions for enabling a processor to perform the synchronization of the consolidated database with the remote data based on the snapshot, wherein the synchronization allows transactional access and updates to the remote data included in the synchronization to occur while the synchronization occurs, wherein the updates are not included in the snapshot, and wherein the consolidated database includes the consolidated data synchronized with the remote data of the snapshot upon a completion of the synchronization.

17. The computer program product of claim 16, wherein said instructions further comprise:

instructions for enabling a processor to maintain the row condition state including an insert state value, a delete state value, and a commit state value for each row of the remote data in the remote database system.

18. The computer program product of claim 16, wherein the metadata includes another value indicating whether the remote data of the row has been uploaded from the remote device but has not yet been confirmed as being committed to the consolidated database.

19. The computer program product of claim 17, wherein said instructions for maintaining the metadata comprise:

instructions for enabling a processor to include at least an upload condition value to condition row processing during the synchronization.

20. The computer program product of claim 19, wherein said instructions further comprise instructions for enabling a processor to set at least the upload condition value when a commit of a row occurs during the synchronization and clear at least the upload condition value when the synchronization completes.

21. The computer program product of claim 19, wherein said instructions further comprise instructions for enabling a processor to indicate a first upload condition value when no transaction commits have occurred after initiation of the synchronization, a second upload condition value for a row that requires synchronization, and a third upload condition value for a row that does not require synchronization.

* * * * *